(12) United States Patent
Kim et al.

(10) Patent No.: US 10,404,427 B2
(45) Date of Patent: Sep. 3, 2019

(54) MOBILE COMMUNICATION SYSTEM AND PACKET CONTROL METHOD IN THE MOBILE COMMUNICATION SYSTEM

(75) Inventors: Sang Bum Kim, Seoul (KR); Soeng Hun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/699,123

(22) PCT Filed: Jun. 9, 2011

(86) PCT No.: PCT/KR2011/004242
§ 371 (c)(1),
(2), (4) Date: Nov. 20, 2012

(87) PCT Pub. No.: WO2011/155784
PCT Pub. Date: Dec. 15, 2011

(65) Prior Publication Data
US 2013/0070682 A1    Mar. 21, 2013

(30) Foreign Application Priority Data

Jun. 9, 2010 (KR) .................. 10-2010-0054583

(51) Int. Cl.
*H04W 4/00* (2018.01)
*H04L 5/00* (2006.01)
(Continued)

(52) U.S. Cl.
CPC ............ *H04L 5/0032* (2013.01); *H04L 5/001* (2013.01); *H04L 1/1607* (2013.01); *H04W 36/0069* (2018.08)

(58) Field of Classification Search
CPC ..... H04W 80/04; H04W 84/12; H04W 88/06; H04W 88/08; H04W 84/18
(Continued)

(56) References Cited

U.S. PATENT DOCUMENTS

2001/0055319 A1* 12/2001 Quigley .................. H04L 1/203
370/480
2003/0157927 A1*  8/2003 Yi ........................ H04L 63/0457
455/411
(Continued)

FOREIGN PATENT DOCUMENTS

CN        101373998 A    2/2009
CN        101394378 A    3/2009
(Continued)

OTHER PUBLICATIONS

U.S. Appl. No. 61/303,769 Provisional Specification.*
(Continued)

*Primary Examiner* — Siren Wei
(74) *Attorney, Agent, or Firm* — Jefferson IP Law, LLP (57) ABSTRACT

The present invention relates to a protocol structure and packet segmentation and NACK information feedback mechanism for efficient data transmission in a mobile communication in which a terminal receives data on the multiple carriers from multiple base stations. The present invention proposes a protocol structure appropriate for a mobile communication system supporting inter-eNB carrier aggregation and the terminal and base station operations for packet efficient segmentation and efficient NACK information feedback in association with the protocol structure.

18 Claims, 11 Drawing Sheets

(51) Int. Cl.
*H04L 1/16* (2006.01)
*H04W 36/00* (2009.01)

(58) Field of Classification Search
USPC .............................. 370/328, 326, 327, 329
See application file for complete search history.

(56) References Cited

U.S. PATENT DOCUMENTS

| | | | |
|---|---|---|---|
| 2005/0281232 A1 | 12/2005 | Kim et al. | |
| 2006/0067238 A1* | 3/2006 | Olsson ................. | H04L 1/0083 370/242 |
| 2006/0072504 A1 | 4/2006 | Hu | |
| 2006/0182030 A1* | 8/2006 | Harris ................... | H04L 1/1809 370/230 |
| 2007/0291695 A1 | 12/2007 | Sammour et al. | |
| 2008/0253334 A1* | 10/2008 | Torsner ................ | H04W 36/02 370/331 |
| 2009/0168724 A1* | 7/2009 | Umesh et al. ................ | 370/331 |
| 2009/0225711 A1* | 9/2009 | Sammour et al. ............ | 370/329 |
| 2010/0110895 A1* | 5/2010 | Wu ....................... | H04W 28/06 370/241 |
| 2010/0118780 A1* | 5/2010 | Umesh .................. | H04L 1/1848 370/328 |
| 2010/0157904 A1* | 6/2010 | Ho ........................ | H04W 12/02 370/328 |
| 2011/0275359 A1* | 11/2011 | Sebire ..................... | H04L 5/001 455/422.1 |
| 2012/0020319 A1 | 1/2012 | Song et al. | |
| 2013/0176988 A1* | 7/2013 | Wang .................... | H04W 28/08 370/331 |

FOREIGN PATENT DOCUMENTS

| | | | |
|---|---|---|---|
| CN | 101588652 A | | 11/2009 |
| CN | 101631353 A | * | 1/2010 |
| JP | 2006-109463 A | | 4/2006 |
| KR | 10-2005-0119613 A | | 12/2005 |
| KR | 10-2006-0051924 A | | 5/2006 |
| KR | 10-2010-0014507 A | | 2/2010 |
| WO | WO 2008076073 A1 * | 6/2008 | ............ H04W 36/26 |
| WO | 2008-115124 A2 | | 9/2008 |
| WO | 2009140862 A1 | | 11/2009 |

OTHER PUBLICATIONS

TS 36.523-1, 'Evolved Universal Terrestrial Radio Access(E-UTRA) and Evolved Packet Core(EPC); User Equipment (UE) Conformance Specification; Part 1 Protocol Conformance Specification', 3GPP TS 36.523-1 v2.0.0, Nov. 2008.

"3rd Generation Partnership Project; Technical Specification Group Radio Access Network; Evolved Universal Terrestrial Radio Access (E-UTRA); Radio Link Control (RLC) protocol specification (Release 9)", 3GPP TS 36.322, V9.1.0, Apr. 21, 2010, pp. 1-39.

Ericsson, "Stopping of T_reordering when VR(UX) equals VR(UH)", 3GPP TSG-RAN WG2 #63, Tdoc R2-083921, Jeju Island, Korea, Aug. 11, 2008.

Catt, "Clarification of Triggering Conditions for T_reordering", 3GPP TSG-RAN WG2 Meeting #64, R2-086500, Prague, Czech Republic, Nov. 3, 2008.

"On the Design of Relay Node for LTE-Advanced", Texas Instruments, 3GPP TSG RAN WG1 #56, R1-090593, Feb. 9-13, 2009, Athens, Greece.

Larmo et al., "The LTE Link-Layer Design", LTE Part II: 3GPP Release 8, IEEE Communications Magazine, Apr. 2009.

"L2 Segmentation in Carrier Aggregation", Alcatel-Lucent Shanghai Bell, TSG-RAN WG2#69, R2-101387, Feb. 22-26, 2010, San Francisco, USA.

* cited by examiner

MOBILE COMMUNICATION SYSTEM AND PACKET CONTROL METHOD IN THE MOBILE COMMUNICATION SYSTEM

BACKGROUND OF THE INVENTION

Field of the Invention

The present invention relates to a protocol structure and packet segmentation and NACK information feedback mechanism for efficient data transmission in a mobile communication in which a terminal receives data on the multiple carriers from multiple base stations. The present invention proposes a protocol structure for a mobile communication system supporting inter-eNB carrier aggregation and packet segmentation and efficient NACK information feedback method appropriate for the protocol structure.

Description of the Related Art

Mobile communication systems have developed to provide the subscribers with voice communication services on the move. With the advance of technologies, the mobile communication systems have been evolved to support high speed data communication services as well as the standard voice communication services. Recently, as one of the next generation mobile communication system, Long Term Evolution-Advanced (LTE-A) is under standardization by $3^{rd}$ Generation Partnership Project (3GPP). LTE-A is a high speed packet-based communication technology aiming at the data rate of up to 100 Mbps higher than that of the current technology.

As the LTE-A standard is evolving, various novel techniques are adopted to increase the packet transmission speed of a UE using multiple downlink or uplink channels. Such a technique is advantageous in maximizing the packet transmission speed per UE and referred to as Carrier Aggregation (CA). An eNB is capable of allocating multiple channels to serve a single UE, and the UE is capable of being served by multiple eNBs located at different positions. In the case that at least two eNBs are involved in the CA, this is referred to as inter-eNB CA.

DISCLOSURE OF INVENTION

Technical Problem

In the inter-eNB CA, if the transmission nodes are located at different positions, the nodes may experience different channel conditions. Accordingly, there is a need of a method for managing the packets transmitted to the UE in accordance with the channel conditions of the respective eNBs. The inter-eNB CA is also influencing the NACK information feedback mechanism. That is, the packets are transmitted by two eNBs, the reception delay may occur more frequently and become longer. There is therefore a need of a NACK information transmission method for use in association with the inter-eNB CA.

The present invention aims to propose a protocol structure for supporting inter-eNB CA and provide a packet segmentation and NACK transmission method and apparatus appropriate for the protocol structure.

Solution to Problem

In accordance with an aspect of the present invention, a packet control method of a mobile communication system includes transmitting, at a Mobility Management Entity (MME), packets to a first base station; delivering, at the first base station, a part of the packets received from the MME to a terminal and rest packet to a second base station; forwarding, at the second base station, the packets which are segmented into segments having a predetermined size and to which segmented Media Access Control Control-Element (seg MAC CE) is added to the terminal; and feeding back, at the terminal, Non-Acknowledge (NACK) information corresponding to the packets to the first and second base stations.

Preferably, forwarding includes adding an seg MAC CE sub-header indicating the seg MAC CE to a MAC sub-header.

Preferably, the seg MAC CE includes a sequence number, a first segment indicator, and a last segment indicator.

Preferably, adding the seg MAC CE includes determining whether a segment is a first segment of the packet and setting, when the segment is determined as the first segment, the first segment indicator to 1; and determining whether the segment is a last segment of the packet and setting, when the segment is determined as the last segment, the last segment indicator to 1.

Preferably, feeding back includes updating a received state variable (VR(R)) and a highest received state variable (VR(H)) using the received packet; controlling operation of a timer for transmitting the NACK information according to the VR(R) and the VR(H); and transmitting the NACK information according to the control of the timer operation.

Preferably, controlling operation of a timer includes stopping, when the VR(R) and VR(H) are not equal to each other, the timer.

Preferably, controlling operation of a timer includes determining, when the VR(R) and VR(H) are equal to each other, whether the timer is running; and starting, when the timer is not running, the timer according to the VR(R).

Preferably, feeding back includes generating a STATUS Packet Data Unit (PDU) including the NACK information using the received packet and comparing the STATUS PDU with a previously generated STATUS PDU; and discarding, when the generated STATUS PDU is identical with the previously generated STATUS PDU, the generated STATUS PDU.

preferably, feeding back includes transmitting, when the generated STATUS PDU is not identical with the previously generated STATUS PDU, the generated STATUS PDU.

In accordance with another aspect of the present invention, a packet management mobile communication system includes a Mobility Management Entity (MME) which transmits packets; a first base station which transmits the packets received from the MME to a second base station and a terminal; a second base station which segments the packets into segments having a predetermined size, adds a segmented Media Access Control Control-Element (seg MAC CE) to the segmented packets, and transmits the segmented packets to the terminal; and a terminal which feeds back Non-Acknowledge (NACK) information corresponding to the packets received from the first and second base station.

Preferably, the seg MAC CE comprises a sequence number, a first segment indicator, and a last segment indicator.

Preferably, the second base station determines whether a segment is a first segment of the packet and sets, when the segment is determined as the first segment, the first segment indicator to 1, determines whether the segment is a last segment of the packet and sets, when the segment is determined as the last segment, the last segment indicator to 1.

Preferably, the terminal updates a received state variable (VR(R)) and a highest received state variable (VR(H)) using the received packet, determines whether the VR(R) and VR(H) are equal to each other, controls operation of a timer for transmitting the NACK information, and transmits the NACK information according to the control of the timer operation.

Preferably, the terminal stops, when the VR(R) and VR(H) are not equal to each other, the timer.

Preferably, the terminal determines, when the VR(R) and VR(H) are equal to each other, whether the timer is running and starts, when the timer is not running, the timer according to the VR(R).

Advantageous Effects

According to the present invention, an eNB is capable of forwarding data to another eNB, and each eNB may segment the packets depending on the channel condition. Since the data are received from a plurality of eNBs, it is possible to avoid unnecessary NACK information feedbacks occurring frequently.

DETAILED DESCRIPTION OF EXEMPLARY EMBODIMENTS

Exemplary embodiments of the present invention are described with reference to the accompanying drawings in detail. Detailed description of well-known functions and structures incorporated herein may be omitted to avoid obscuring the subject matter of the present invention. Furthermore, terms used herein are defined by taking functions of the present invention into account and can be changed according to the practice or intention of users or operators. Therefore, definition of the terms should be made according to overall disclosures set forth herein.

The present invention proposes a protocol structure for efficient data transmission in a mobile communication system in which a UE receives data from multiple eNBs through multiple carriers.

Figure 1:
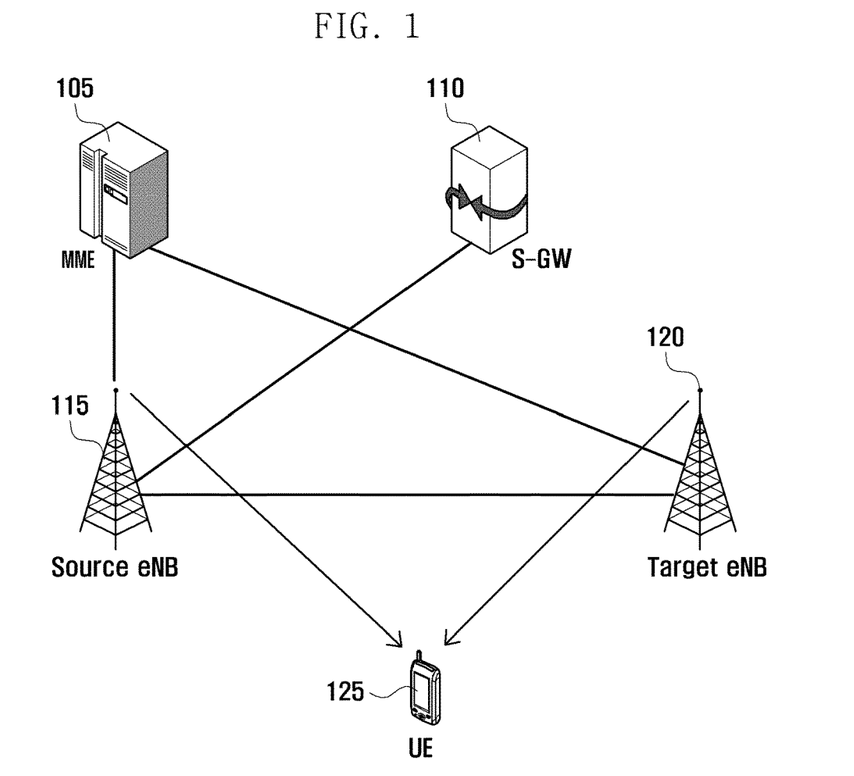
FIG. 1 is a conceptual diagram illustrating inter-eNB CA data transmission according to the present invention.

FIG. 1 is a conceptual diagram illustrating inter-eNB CA data transmission according to the present invention.

Referring to FIG. 1, the entity 105 is a Mobility Management Entity (MME) responsible for controlling eNBs, i.e. the Source eNB 115 as the first eNB and the Target eNB 120 as the second eNB.

The entity 110 is the serving gateway (S-GW) responsible for delivering packets to the eNB. Since it is difficult for the S-GW 110 to transmit packets to both the source eNB 115 and the target eNB 120 simultaneously, it sends the packets to only the source eNB 115. The source eNB 115 sorts packets per target eNB.

Next, the source eNB 115 delivers a part of the received packets to the target eNB 120 and the rest to the UE 125. Also, the target eNB 120 transmits the packets received from the source eNB 115 to the UE 125.

Figure 2:
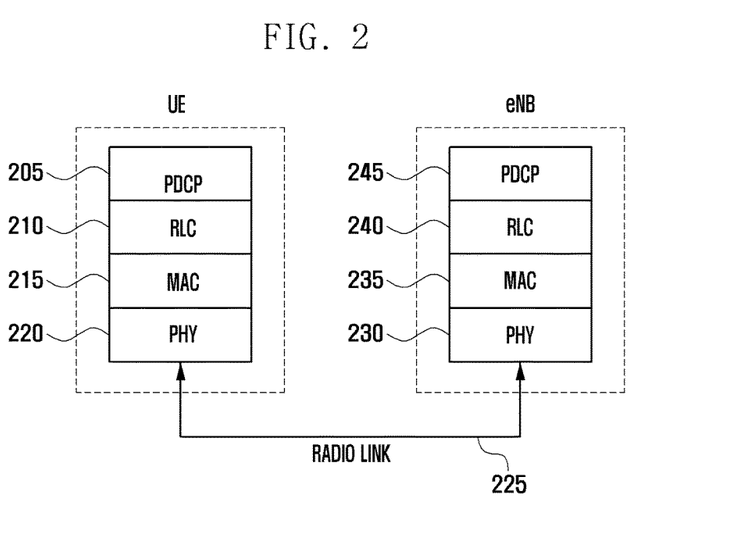
FIG. 2 is a diagram illustrating a protocol structure of the eNB according to the present invention.

A description is made of the protocol structure for packet transmission of each UE with reference to FIG. 2.

FIG. 2 is a diagram illustrating a protocol structure of the eNB according to the present invention.

Referring to FIG. 2, the eNB of an LTE system includes a Packet Data Convergence Protocol (PDCP) layer 205, Radio Link Control (RLC) layer 210, a Media Access Control (MAC) layer 215, and a Physical (PHY) layer 220.

The MAC layer 215 notifies the RLC layer 210 of the size of the packet to be transmitted by the MAC layer 215 in consideration of the channel condition. The RLC layer 210 segments or assembles the packets received from the PDCP layer 205 according to the packet size notified by the MAC layer 215 and then delivers the packets to the MAC layer 215. The MAC layer 215 assembles the single or multiple packets received from the RLC layer 210, adds a MAC subheader to the assembled packet, and delivers the packet to the PHY layer 220. The PHY layer 220 transmits the packet over radio channel 225.

Figure 3:
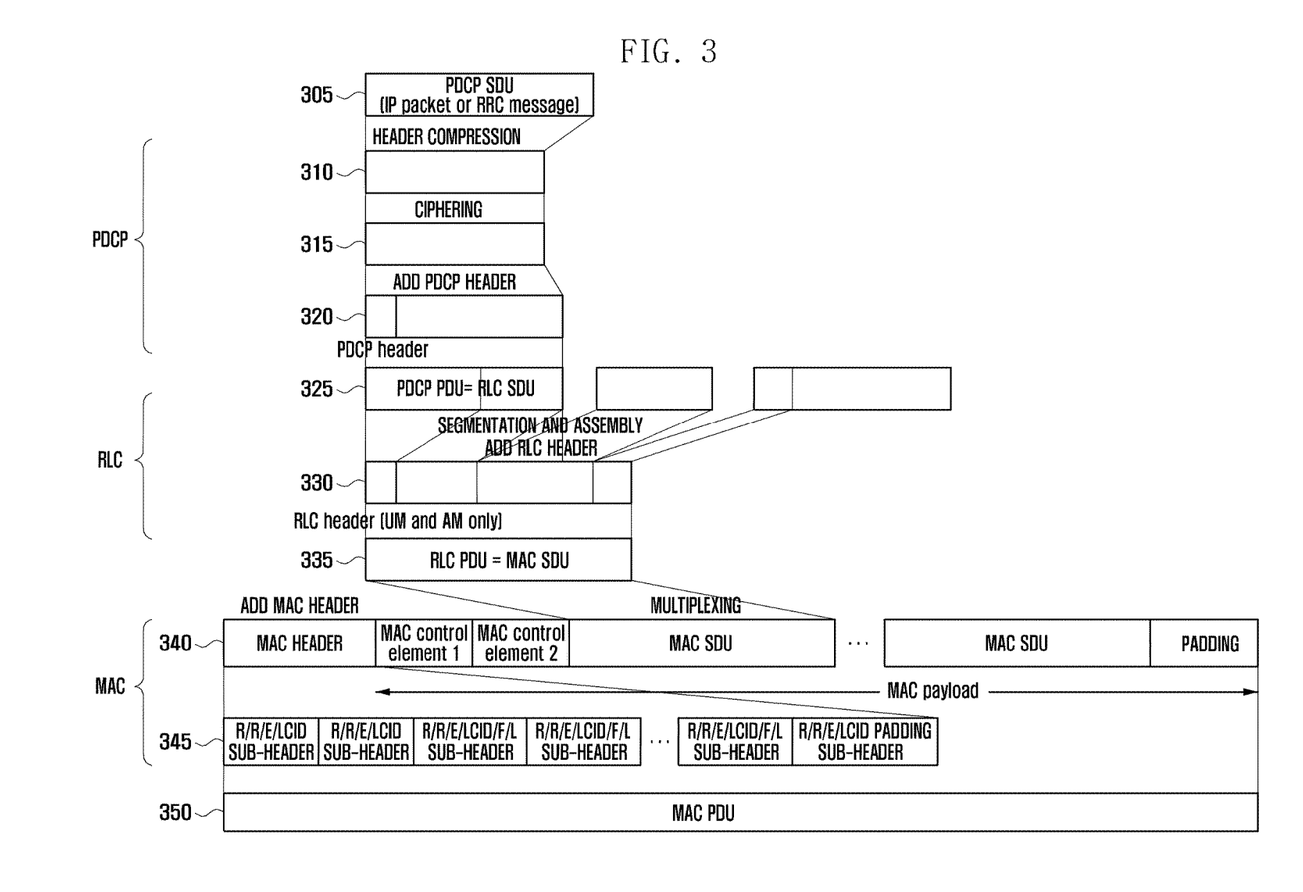
FIG. 3 is a diagram illustrating packet segmentation and assembly in the LTE protocol structure according to the present invention.

FIG. 3 is a diagram illustrating packet segmentation and assembly in the LTE protocol structure according to the present invention.

The Packet Data Convergence Protocol Service Data Unit (PDCP SDU) 305 is an IP packet or a Radio Resource Control (RRC) message received from the S-GW 110 or the MME 105. The PDCP layer performs head compression 310, ciphering 315, and PDCP header insertion 320 to generate a PDCP Packet Data Unit (PDU). The PDCP PDU is delivered to the RLC layer.

The PDCP PDU is equal to the RLC SDU 325, and the RLC PDU is generated by segmenting or assembling the RLC SDU 335 according to the packet size informed by the MAC layer as denoted by reference number 330. The generated RLC PDU is delivered to the MAC layer. The RLC PDU is equal to the MAC SDU, and the MAC PDU is generated by combining the MAC header, MAC Control Element, and RLC SDU. At this time, the MAC header is composed of the MAC Control Element and the sub-headers 345 for indicating the RLC SDUs.

In the case that the eNBs transmitting the packets are distributed in the inter eNB CA, the channel conditions of the respective eNBs differ from each other. According the packet segmentation and assembly scheme has to be determined depending on whether each eNB operates with separate RLC layer 210 and MAC layer 215 or only with the MAC layer 215. In the present invention, the MAC layer 215 is divided into at least two sub-layers, and the packet segmentation function of the RLC layer 210 is performed at on the MAC layer 215. As a consequence, it is possible to solve the problem such as packet transmission delay and complexity.

Figure 4:
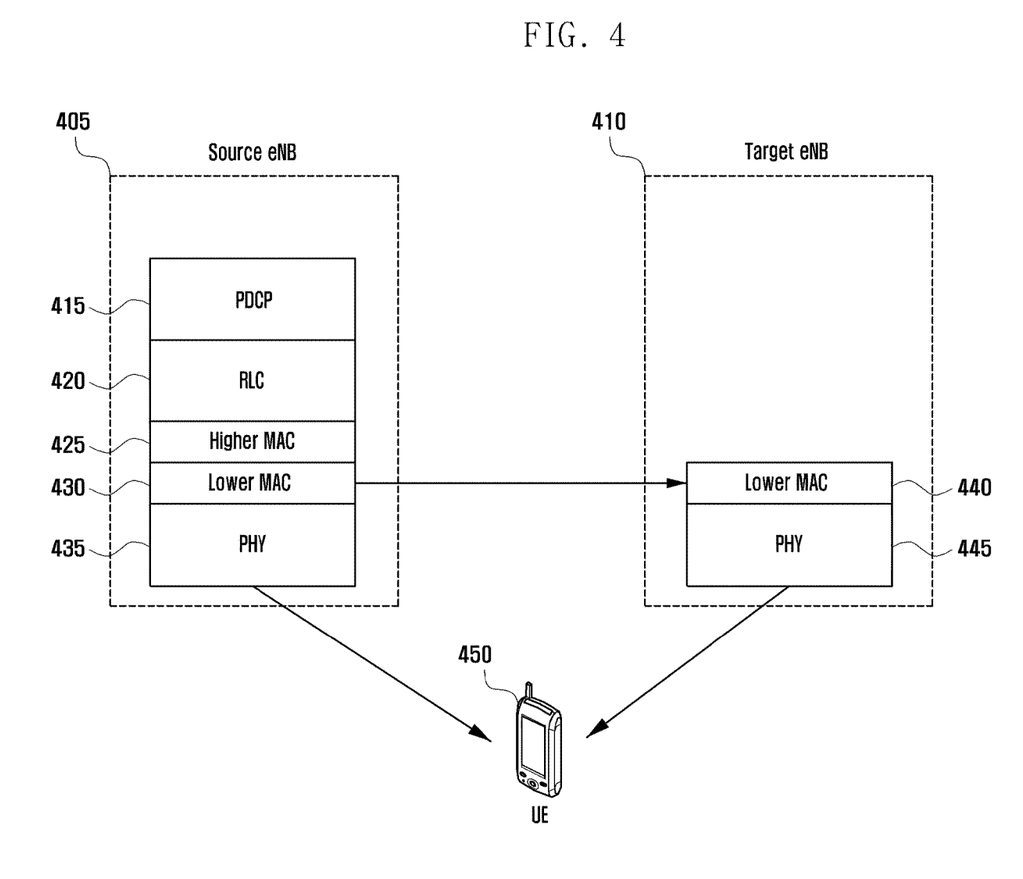
FIG. 4 is a diagram illustrating a protocol structure for supporting the inter-eNB CA according to an embodiment of the present invention.

FIG. 4 is a diagram illustrating a protocol structure for supporting the inter-eNB CA according to an embodiment of the present invention.

Referring to FIG. 4, the source eNB 405 connects to the S-GW and receives the packet to be delivered to the UE 450. The target eNB 410 receives predetermined amount of the packets from the source eNB 405 and delivers the received packets to the UE.

The source eNB 405 consists of a PDCP layer 415, an RLC layer 420, a higher MAC layer 425, a lower MAC layer 430, and a PHY layer 435. In order to support the inter-eNB CA, the individual layers assigned respective roles. The target eNB 410 is provided with only the MAC layer 440 and the PHY layer 445 to support the inter-eNB CA. Accordingly, the legacy eNB and the inter-eNB CA-capable eNB 450 has different protocol structures.

The MAC layers 425 and 430 requests the RLC layer 420 for the size of the packet to be delivered to the MAC layers 425 and 430 to fit for generating the MAC PDU in consideration of the channel condition. The packets received from the PDCP layer 415 are segmented or assembled according to the packet size and then delivered to the MAC layers 425 and 430.

In the case that the transmission nodes are distributed in the inter eNB CA, the channel conditions of the nodes may differ from each other. This may causes the complexity of the process for the RLC layer 420 to receive the information on the packet size from the MAC layers 425 and 430. Also, the packet size may become invalid due to the time delay between timings of the request from the target eNB 410 and the application of the packet size. The present invention aims to solve the time delay complexity caused by consigning the packet segmentation function of the RLC layer 420 to the MAC layer 440 in the target eNB 410 by dividing the MAC layer into the higher MAC layer 425 and the lower MAC layer 430.

Figure 5:
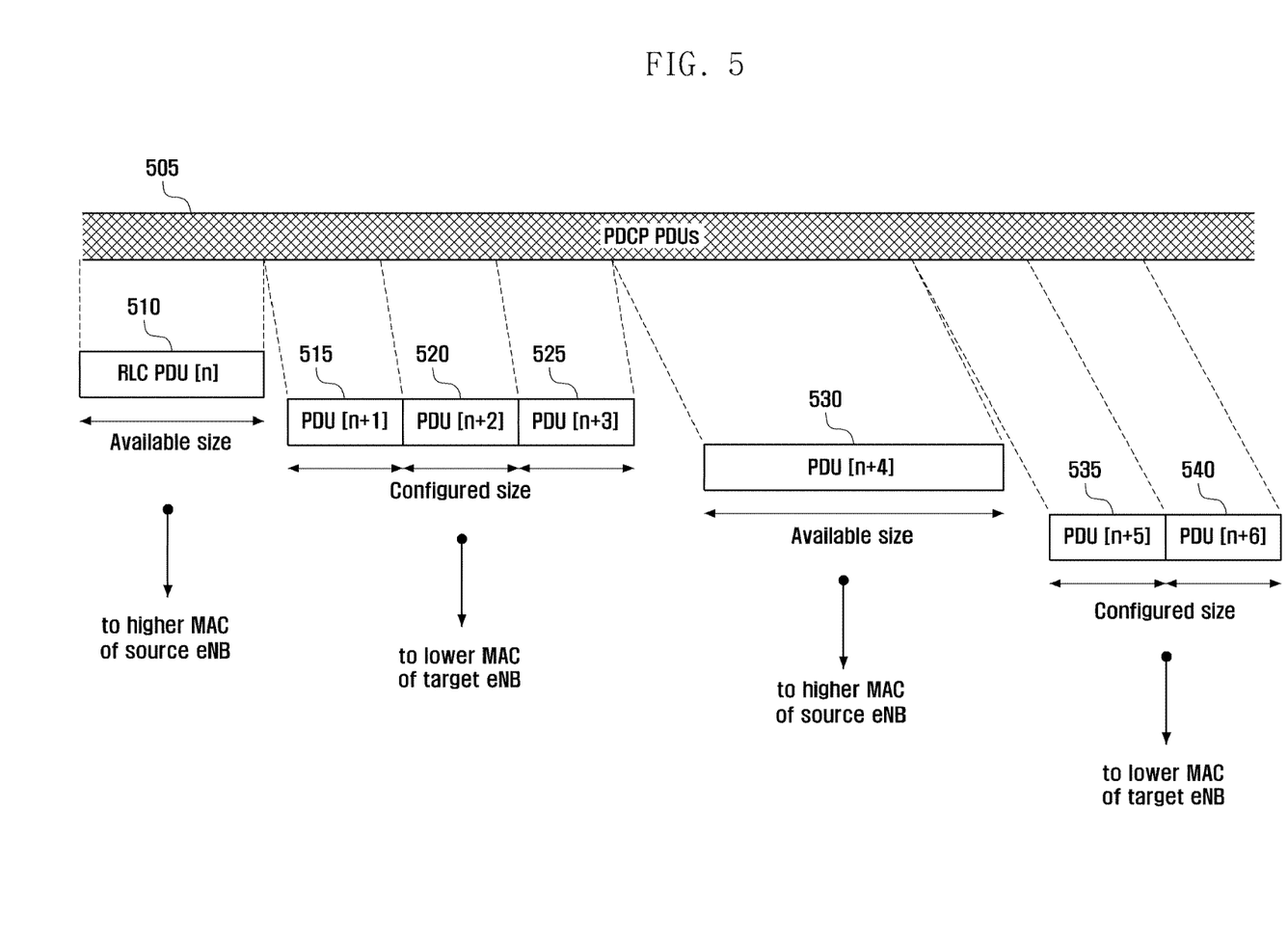
FIG. 5 is a diagram illustrating the packet segmentation operation of the RLC layer according to an embodiment of the present invention.

FIG. 5 is a diagram illustrating the packet segmentation operation of the RLC layer according to an embodiment of the present invention.

Referring to FIG. 5, the RLC layer of the source eNB receives the PDCP PDUs 505 from the PDCP layer. The higher MAC layer of the source eNB informs the RLC layer of the size of the packets to be transmitted. The higher MAC layer requests the RLC layer for the packet size as predetermined or determined randomly.

As shown in FIG. 5, the RLC PDUs 510 and 530 to be transmitted to the source eNB may have different sizes determined in consideration of the channel condition of the source eNB. In contrast, the packets 515, 520, 525, 535, and 540 to be transmitted to the target eNB are segmented or assembled into a predetermined size to be delivered to the lower MAC layer of the target eNB. The lower MAC layer of the source eNB generates the MAC PDUs to the PHY layer.

The packet transmitted by the source eNB has not the size requested, by the lower MAC layer of the target eNB, to fit for generating MAC PDU. Accordingly, there is a need for the lower MAC layer of the target eNB to generating the MAC PDU efficiently. Since the data are transmitted by the eNBs located at different positions, the packets are likely to arrive out of order due to the different propagation delays. This is likely to cause frequent NACK transmission. Accordingly, there is a need to compensate the NACK transmission method in the conventional LTE system. The first embodiment proposes a MAC PDU configuration method, and the second embodiment proposes a NACK information transmission method.

<First Embodiment>

Figure 6:
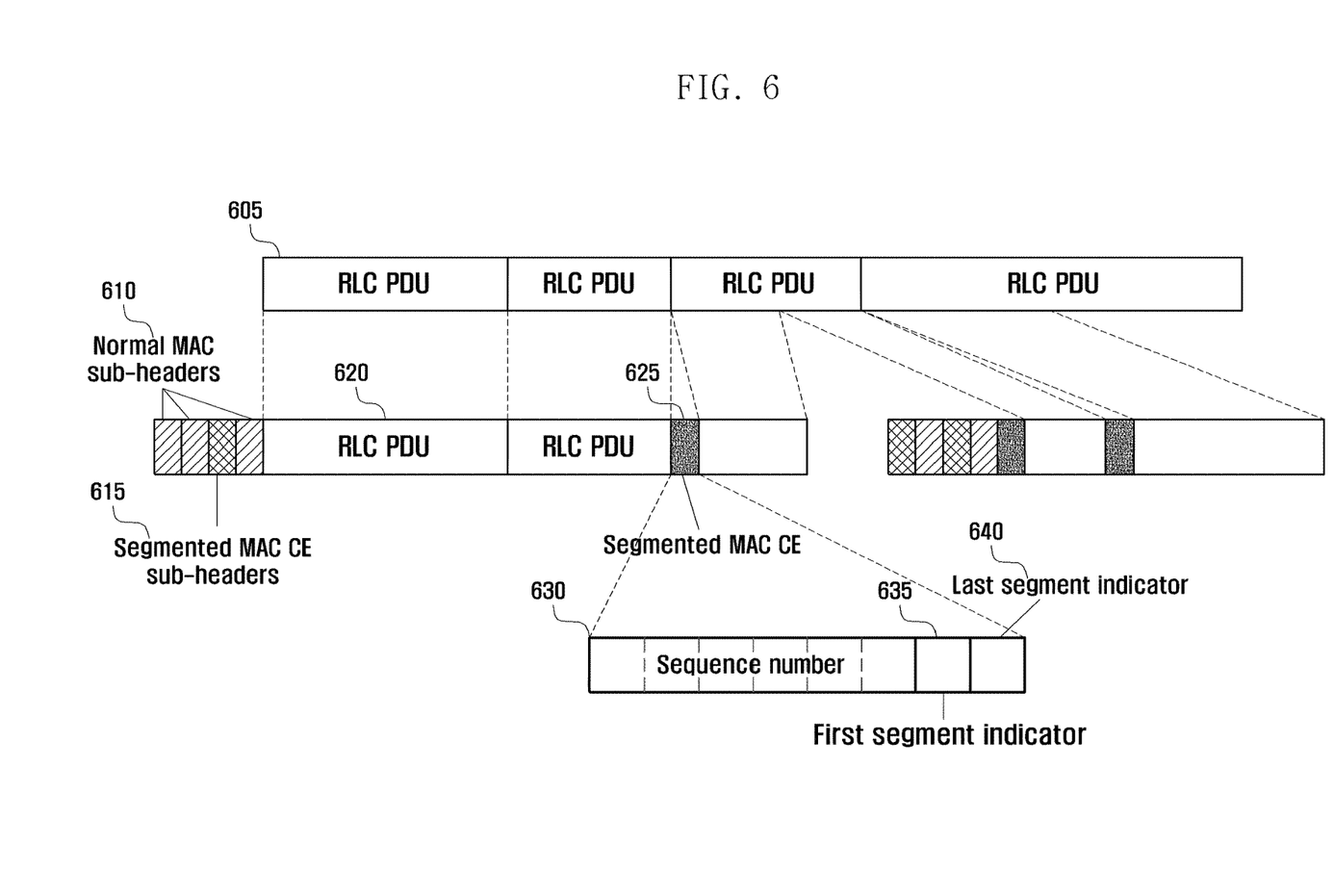
FIG. 6 is a diagram illustrating the MAC PDU configuration in the lower MAC layer of the target eNB according to an embodiment of the present invention.

FIG. 6 is a diagram illustrating the MAC PDU configuration in the lower MAC layer of the target eNB according to an embodiment of the present invention.

Referring to FIG. 6, the RLC PDUs 605 transmitted by the source eNB do not have the packet size requested by the lower MAC layer of the target eNB. Accordingly, it is impossible to fill the MAC PDU 610 with the RLC PDU 605 precisely. Furthermore, in order to avoid redundant padding, the RLC PDU 605 is transmitted as segmented. At this time, the MAC layer of the UE has to know about the segmentation process to assemble the RLC PDUs and recover the original RLC PDU.

For the purpose of RLC PDU assembly, a segment MAC Control Element (seg MAC CE) 625 is added to the head of the segmented RLC PDU 605. The seg MAC CE 625 includes s Sequence number (SN) 630, a first segment indicator 635, and a last segment indicator 640. The SN 630 increases in proportion to the number of the segmented RLC PDUs. If a segment is the first segment of the RLC PDU, the segment indicator is set to 1 as the first segment indicator and, otherwise, 0. If a segment is the last segment of the RLC PDU, the segment indicator is set to 1 as the last segment indicator and, otherwise, 0.

In order to indicate the existence of the seg MAC CE 625, the seg MAC CE sub-header 615 is added to the MAC sub-header. The UE is capable of checking the number of RLC PDU segments contained in the corresponding MAC PDU based on the seg MAC CE sub-header. The UE is capable of recovering the RLC PDU 605 from the received MAC PDUs using the first segment indicator 635 and the last segment indicator 640.

In order to segment/de-segment the RLC PDUs, a sequence number and other information are added to all of the packets. For example, every RLC PDU 650 is assigned a sequence number always regardless of the segmentation/assembly of the contained payload. This is because the RLC layer is responsible for the reordering function as well as the segmentation/assembly function. The lower MAC layer has not reordering function. The segmentation/assembly of the payload does not occurs always but only when the data amount scheduled by the eNB differs from the size of the RLC PDU to be transmitted. Accordingly, it is inefficient to assign the redundant information such as sequence number (SN) always. In order to overcome this problem, the present invention proposes inserting sequence number (SN)/first segment indicator/last segment indicator as the seg MAC CE only when the RLC PDU is segmented. That is, the seg MAC CE 625 is added not to all of the RLC PDUs (or MAC SDUs) but the segmented RLC SDUs, and when the seg MAC CE exists is indicated in the seg MAC CE sub-header 615.

Figure 7:
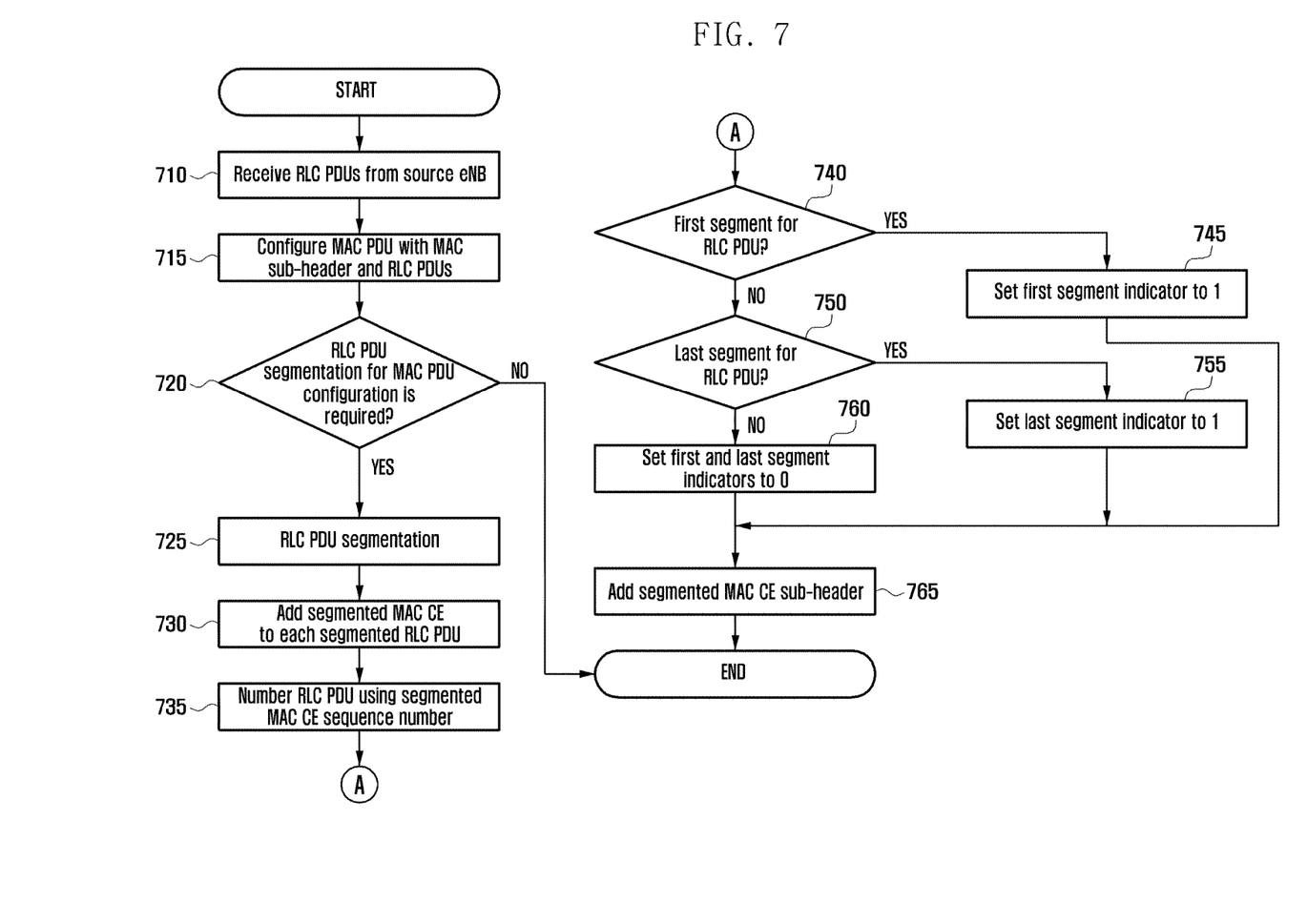
FIG. 7 is a flowchart illustrating the eNB procedure for configuring MAC PDU on the lower MAC layer of the target eNB.

FIG. 7 is a flowchart illustrating the eNB procedure for configuring MAC PDU on the lower MAC layer of the target eNB.

Referring to FIG. 7, the target eNB receives the RLC PDUs from the source eNB at step 710. The target eNB configures the MAC PDUs with the MAC sub-headers at step 715. Next, target eNB determines whether it is necessary to segment the RLC PDUs to generate the MAC PDUs at step 720. At this time, the target eNB is capable of determining whether to perform RLC PDU segmentation according to the size of the packet transmitted at the lower MAC layer.

If it is necessary to segment the RLC PDU, the target eNB segments the RLC PDU at step 725. Next, the target eNB adds the seg MAC CE to the individual segmented RLC PDUs at step 730. Next, the target eNB numbers the segmented PDUs with the SN of the segmented RLC PDUs. Here, the target eNB numbers the segmented RLC PDUs in the segmented order.

Next, the target eNB determines whether each segment the first segment of the RLC PDU at step 740. If the segment is the first segment, the target eNB sets the first segment indicator of the first seg MAC CE to 1 at step 745.

If the segment is not the first segment, the target eNB determines whether the segment is the last segment of the RLC PDU at step 750. If the segment is the last segment, the target eNB sets the last segment indicator of the last seg MAC CE to 1.

If the segment is not the last segment, the target eNB sets both the first and last segment indicators to 0 at step 760. After setting the segment indicators, the target eNB adds a seg MAC CE sub-header indicating the seg MAC CE to the MAC server-header at step 765.

Figure 8:
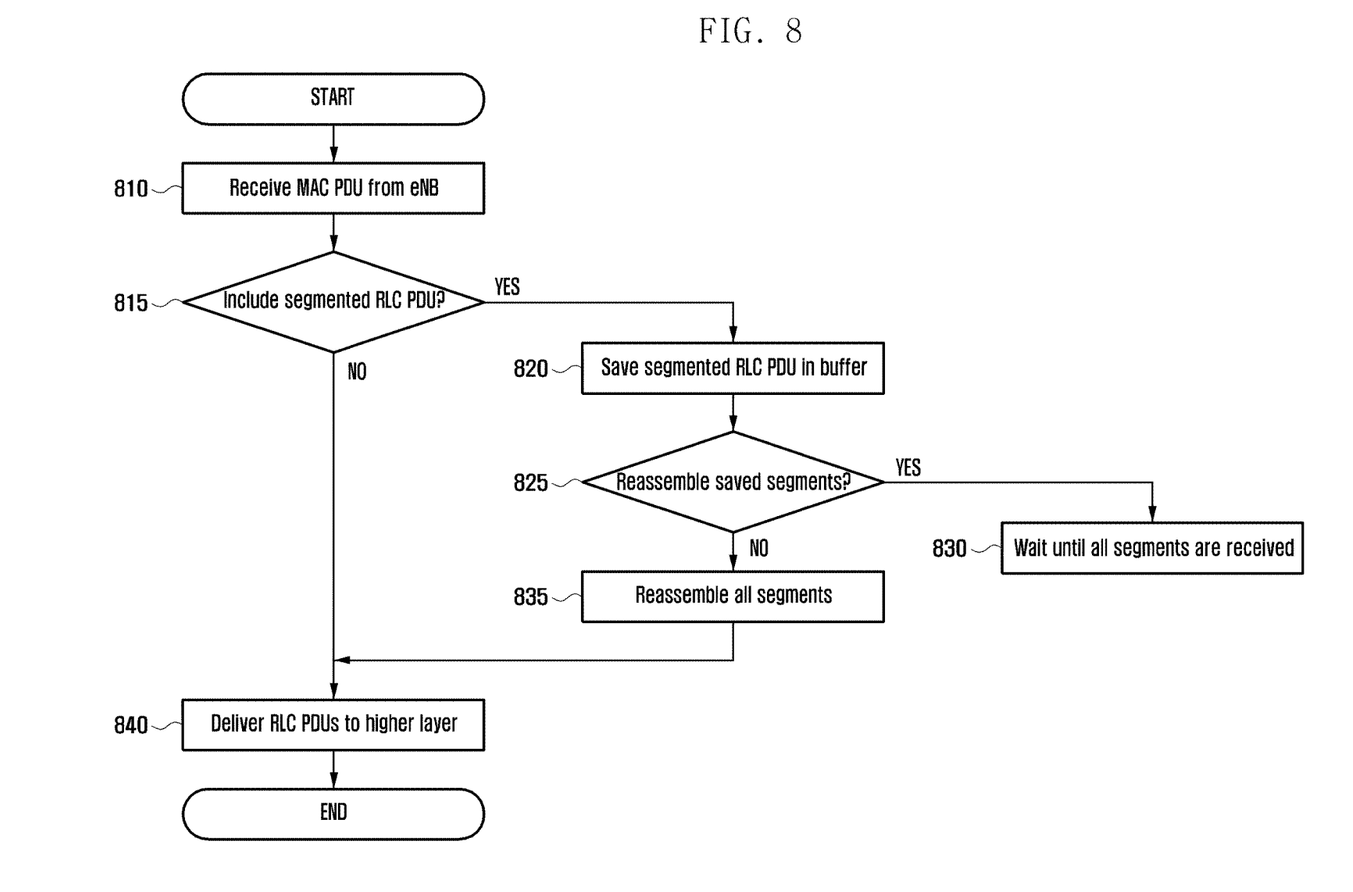
FIG. 8 is a flowchart illustrating a UE procedure for the RLC PDU reassembly according to an embodiment of the present invention.

FIG. 8 is a flowchart illustrating a UE procedure for the RLC PDU reassembly according to an embodiment of the present invention.

Referring to FIG. 8, the UE receives a MAC PDU from the eNB at step 810. The UE analyzes the sub-header of the received MAC PDU to determine whether a segmented RLC PDU is included at step 815. That is, the UE determines whether the sub-header of the MAC PDU includes the seg MAC CE sub-header.

If a segmented RLC PDU is included, the UE saves the segmented RLC PDU in a buffer at step 820. In more detail, the terminal checks the seg MAC CE sub-header in the MAC PDU sub-header. Next, the UE references the MAC CE in the seg MAC CE sub-header to check the sequence number/first segment indicator/last segment indicator of the segmented RLC PDU. Next, the UE determines the MAC SDU following the seg MAC CE as the segmented RLC PDU and saves the segmented RLC PDU in the buffer.

Next, the UE determines whether the saved RLC PDUs can be assembled at step 825. That is, the UE determines all of the segmented RLC PDUs are received. For this purpose, the UE checks the sequence number of the seg MAC CE, sequence number of the segmented RLC PDU, the first segment indicator, and the last segment indicator that are added to the head of the segmented RLC PDU.

If the RLC PDUs cannot be assembled, i.e. if not all of the segmented RLC PDUs are received, the UE waits until all of the segmented RLC PDUs are received at step 830. Otherwise, if all of the segmented RLC PDUs are received, the UE assembles the segmented RLC PDUs into the original RLC PDU at step 835. Finally, the UE delivers the RLC PDU to the higher layer at step 840.

Figure 9:
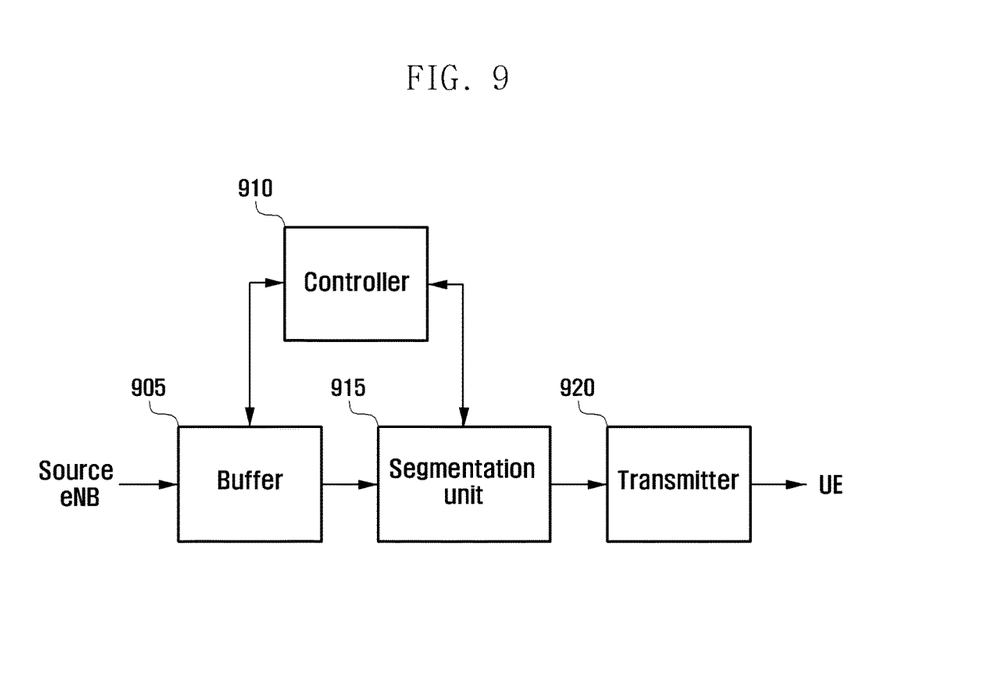
FIG. 9 is a block diagram illustrating the configuration of an eNB for generating the MAC PDU according to an embodiment of the present invention.

FIG. 9 is a block diagram illustrating the configuration of an eNB for generating the MAC PDU according to an embodiment of the present invention.

Referring to FIG. 9, the target eNB includes a buffer 905, a controller 910, a segmentation unit 915, and a transmitter 920.

The buffer 905 saves the RLC PDU received from the source eNB under the control of the controller 910.

When configuring the MAC PDU, the controller 910 compares the packet size determined according to the channel condition at the MAC layer and the size of the RLC PDU saved in the buffer 905 to determine whether to segment the RLC PDU.

The segmentation unit 915 segments the RLC PDU under the control of the controller 910. At this time, the segmentation unit 915 adds the seg MAC CE sequence number, the segmented RLC PDU sequence number, the first segment indicator, and the last segment indicator to the segmented RLC PDUs.

The transmitter 920 transmits the segmented RLC PDUs to the UE in the MAC PDU under the control of the controller 910.

Figure 10:
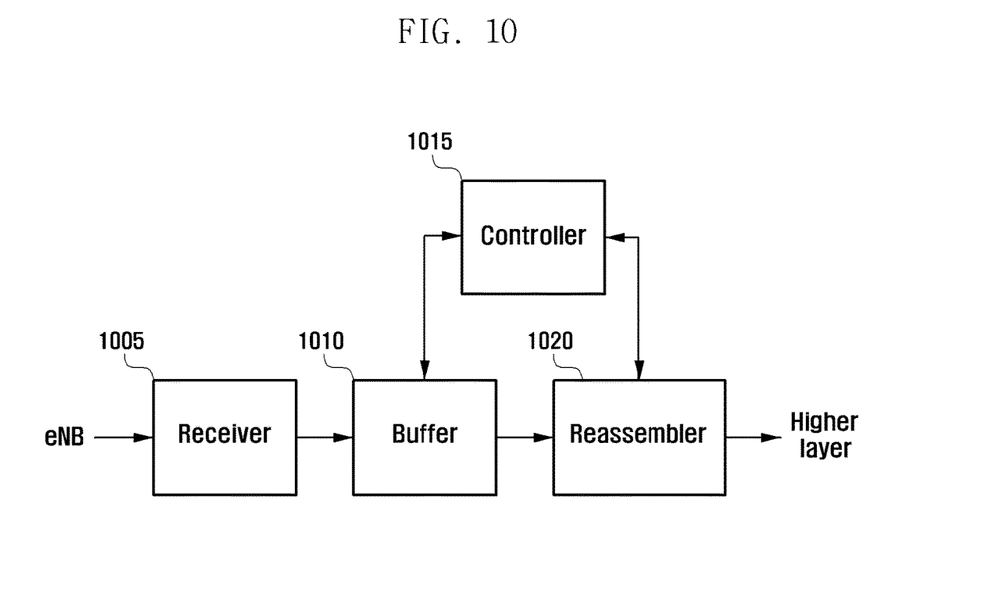
FIG. 10 is a block diagram illustrating the configuration of a UE for assembling the RLC PDUs according to an embodiment of the present invention.

FIG. 10 is a block diagram illustrating the configuration of a UE for assembling the RLC PDUs according to an embodiment of the present invention.

Referring to FIG. 10, the UE includes a receiver 1005, a buffer 1010, a controller 1015, and a reassembler 1020.

The receiver 1005 receives the MAC PDUs transmitted by the eNB.

The buffer 1010 saves the received MAC PDUs under the control of the controller 1015.

When recovering the RLC PDUs from the received MAC PDUs, the controller 1015 determines whether reassembly is necessary. At this time, the controller 1015 uses the seg MAC CE SN, the segmented RLC PDU SN, the first segment indicator, and the last segment indicator.

The reassembler 1020 assembles the segmented RLC PDUs using the seg MAC CE SN under the control of the controller 1015. The reassembled RLC PDU is delivered to the higher layer.

<Second Embodiment>

In the LTE system, the UE transmits a STATUS PDU including Non-Acknowledge (NACK) information about lost packet to the eNB. The eNB performs Automatic Repeat reQuest (ARQ) on the RLC layer based on the NACK information transmitted by the UE.

In the case of the Radio Link Control Acknowledge Mode (RLC AM), if VR(R) and VR(H) have different values, a t-Reordering timer starts. The expiry of the t-Reordering timer triggers generating and transmitting the STATUS PDU. Here, the VR(R) is a Receive state variable indicating that the RLC PDUs having the Sequence Numbers (SN) subsequent to it have been received successfully. The VR(H) is a Highest received state variable indicating the value obtained by adding 1 to the highest one of the SNs of the received RLC PDUs. If the VR(R) and VR(H) have different values, this means that the there is any lost RLC PDU in the order. The STATUS PDU can be requested by the transmitter in a polling mechanism according to a predetermined rule. For reference, the VR(R) and VR(H) are the variables defined in the standard TS 36.322.

A part of the RLC PDUs generated by the source eNB and addressed to the UE is transmitted via the target eNB. Accordingly, the RLC PDUs transmitted via the target eNB arrives at the UE later than the RLC PDUs transmitted directly from the source eNB to the UE. Accordingly, the VR(R) and VR(H) indicating success or failure of reception have different values. In this case, the t-Reordering timer starts such that the STATUS PDU is transmitted at the expiry of the t-Reordering timer. This may cause generating STATUS PDU frequently.

For example, suppose that the source eNB and the target eNB transmit the RLC PDUs as follows. The numbers denote the SN values of the RLC PDUs.

Source eNB: 0.1, 3, 6, 7, 9, 10, 11
Target eNB: 2, 4, 5, 8, 12, 13, 14

Congestion occurs at the target eNB such that the UE receives the RLC PDUs in the following order.

Reception order of RLC PDUs: 0, 1, 3, 6, 7, 9, 10, 2, 4, 5, 12, 13, . . . .

At this time, the STATUS PDU report is not triggered for 0, 1, 12, and 13 where the VR(R) and VR(H) are equal to each other but is triggered for 3, 6, 9, 10, 2, 4, 5, 8, . . . where the VR(R) and VR(H) differ from each other. Such frequent STATUS PDU transmission causes resource waste and thus there is a need of a method for suppressing this. The present invention proposes two methods.

The first method is to stop the t-Reordering timer according to the VR(R). In more detail, if the SN of the received RCL PDU is equal to VR(R), the UE stops t-Reordering timer. Or, if the VR(R) is updated, the UE stops the t-Reordering timer. If the SN of the received RLC PDU is equal to the VR(R) or if the VR(R) is updated after the receipt of the RLC PDU, this means that the received RLC PDU fills the space for a missing RLC PDU. In the convention method, even when the new RLC PDU is a missing RLC PDU, the t-Reordering timer starts if the VR(R) and VR(H) mismatch. In the present invention, however, when a certain RLC PDU is received, if the VR(R) is updated to a new value although the VR(R) and VR(H) updated by the received RLC PDU mismatch, the t-Reordering timer stops running. This makes it possible to avoid triggering unnecessary STATUS PDU.

Figure 11:
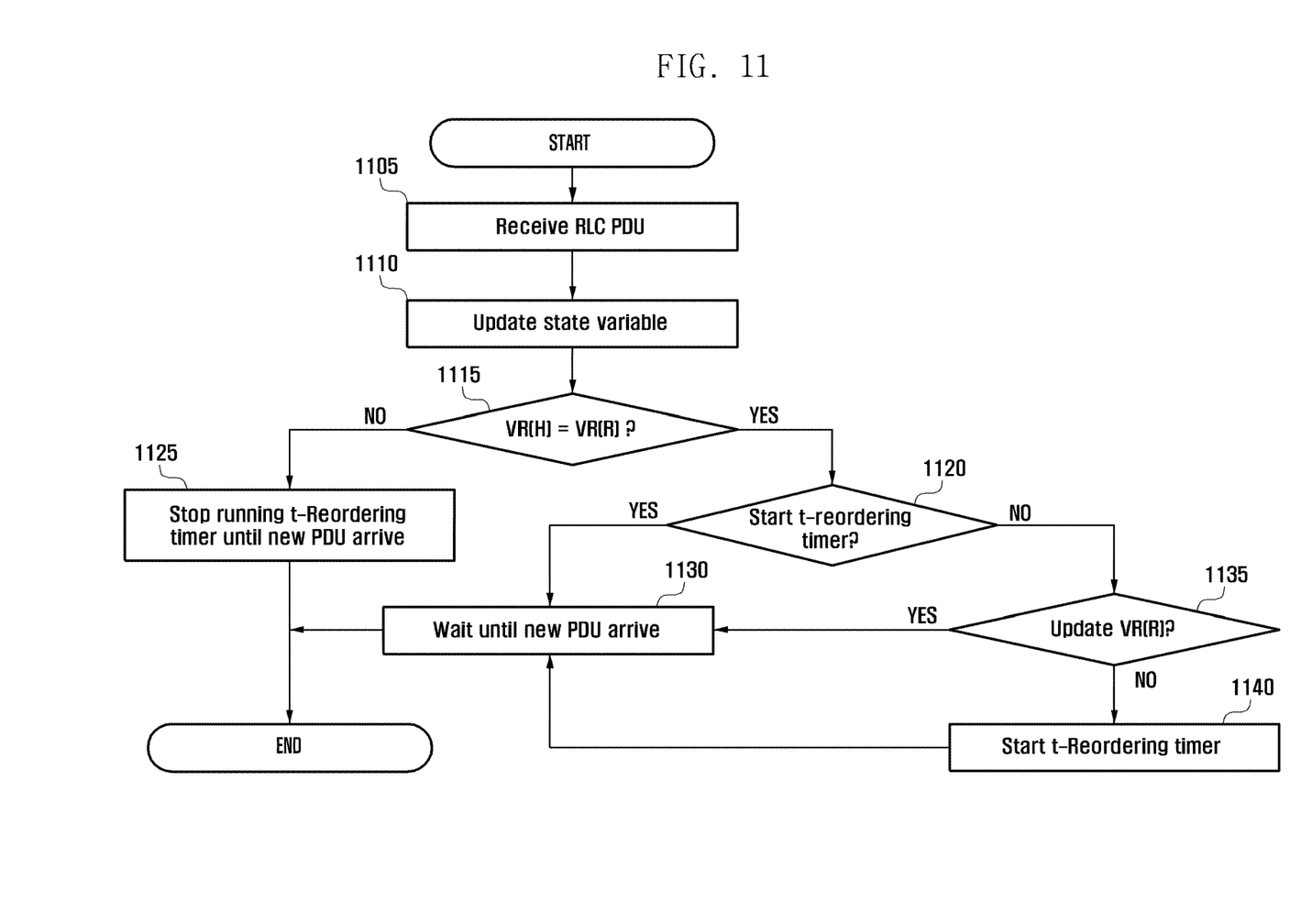
FIG. 11 is a flowchart illustrating the UE procedure according to the first embodiment of the present invention.

FIG. 11 is a flowchart illustrating the UE procedure according to the first embodiment of the present invention.

Referring to FIG. 11, if an RLC PDU is received at step 1105, the UE compares the sequence number of the received RLC PDU and state variables such as VR(R) and VR(H) to update the state variables such as VR(R) and VR(H) to appropriate values at step 1110. The state variable update method is specified in the section 5.1.3.2.2 of TS 36.322 and thus detailed description thereof is omitted herein. The UE compares the updated VR(R) and VR(H) at step 1115. If the VR(R) and VR(H) mismatch, the procedure goes to step 1120 and, otherwise, step 1125.

If the VR(R) and VR(H) match, the UE determines whether the t-Reordering timer is running at step 1120. Otherwise, if the VR(R) and VR(H) mismatch, the UE stops the t-Reordering timer and waits until a new RLC PDU arrives at step 1125.

Returning to step 1120, the UE determines whether the t-Reordering timer is running already. If the t-Reordering timer is running, the UE waits until a new RLC PDU arrives at step 1130.

Otherwise, if the t-Reordering timer is not running, the UE determines whether the VR(R) has been updated as compared to the previous VR(R) at step 1135. If the VR(R) has been updated, the UE waits until the a new RLC PDU arrives at step 1130. If the VR(R) has been updated, this means that a newly received RLC PDU fills the space of the missing PDU. Accordingly, the UE does not starts the t-Reordering timer and the procedure goes to step 1130. Otherwise, if the VR(R) has not been updated, the UE starts the t-Reordering timer at step 1140 and then the procedure goes to step 1130.

Although the description is directed to the method for the UE to determine based on the VR(R) whether to start the t-Reordering timer, the present invention is not limited thereto. That is, the UE is capable of determining whether to start the t-Reordering timer based on the VR(H).

For example, when determining whether to start the t-Reordering timer at step 2235, the UE may check whether the VR(H), other than VR(R), has been updated. If the VR(H) has not been updated after the state variable has been updated with the receipt of a certain RLC PDU, this means that the sequence number of the newly received RLC PDU is lower than that of the VR(H) of the previously received RLC PDU. That is, this means that the new missing RLC PDU is detected due to the newly received RLC PDU. This means that the newly received RLC PDU fills the space for the previous missing PDU. In this case, it is preferred to do not start the t-Reordering timer.

If the VR(H) has been updated at step 1135, i.e. if the VR(H) of the newly received RLC PDU mismatches with that of the previously received RLC PDU, the UE starts the t-Reordering timer at step 1140. Otherwise, if the VR(H) has not been updated, i.e. if the VR(H) of the newly received RLC PDU matches with that of the previously received RLC PDU, the UE waits until a new PDU arrives without starting the t-Reordering timer at step 1130.

The second method is to filter the STATUS PDU determined, by the UE, unnecessary to skip transmission. In order to accomplish this, the UE compares the generated STATUS PDU with the previously transmitted STATUS PDU. If the updated NACK information is not included, the UE skips transmitting the STATUS PDU. A more detailed description is made with reference to FIG. 12.

Figure 12:
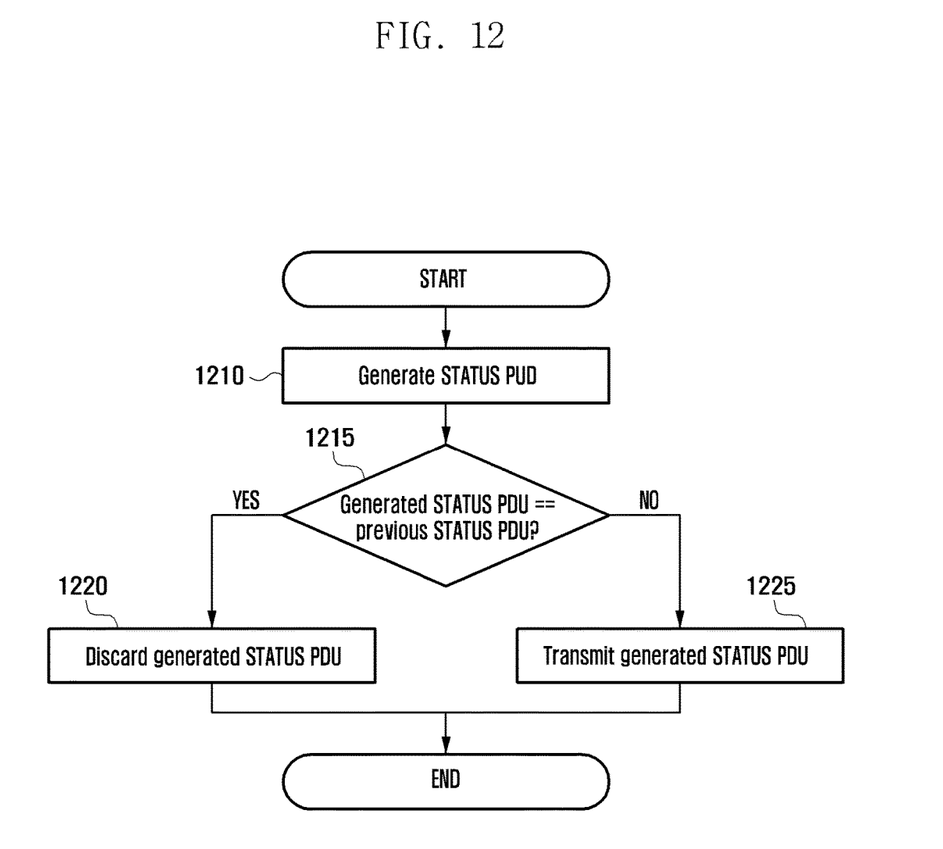
FIG. 12 is a flowchart illustrating the UE procedure according to the second embodiment of the present invention.

FIG. 12 is a flowchart illustrating the UE procedure according to the second embodiment of the present invention.

Referring to FIG. 12, if the VR(R) and VR(H) have different values, the UE generates a STATUS PDU at step 1210. Next, the UE determines whether the generated STATUS PDU is identical with the previously transmitted STATUS PDU at step 1215. If the generated STATUS PDU is identical with the previously transmitted STATUS PDU, the UE discards the generated STATUS PDU at step 1220. Otherwise, if the generated STATUS PDU differs from the previously transmitted STATUS PDU, the UE transmits the generated STATUS PDU at step 1225.

Figure 13:
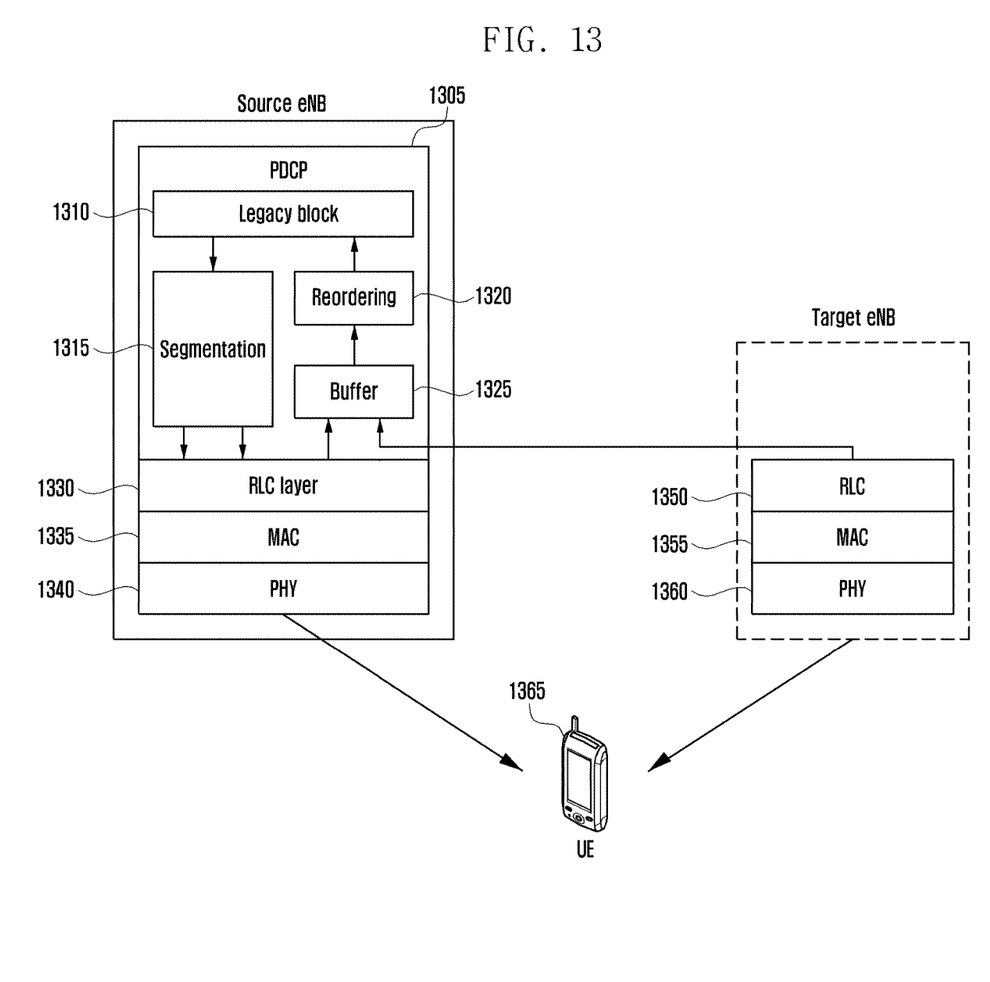
FIG. 13 is a diagram illustrating a separated protocol structure for supporting the inter-eNB CA according to another embodiment of the present invention.

FIG. 13 is a diagram illustrating a separated protocol structure for supporting the inter-eNB CA according to another embodiment of the present invention.

Referring to FIG. 13, the source eNB and target eNB may have separated RLC, MAC, and PHY protocol structure. In order to support the structure proposed in FIG. 13, several functions has to be added to the PDCP layer 1305 of the source eNB.

The extended PDCP layer 1305 includes a segmentation block 1315, a re-ordering block 1320, and a buffer 1325, in addition to the legacy block 1310. The PDCP PDUs output by the legacy block 1310 that are addressed to the UE 1365 are sorted into the PDCP PDUs to be transmitted by the source and target eNBs.

The segmentation block 1315 divides the PDCP PDUs input sequentially into a source eNB-transmitted and a target eNB-transmitted PDCP PDUs rather than segment a signal PDCP PDU. The PDCP PDUs transmitted to the RLC layers 1330 and 1350 of the source and target eNBs are processed according to the convention procedure.

The packets transmitted by the UE may be received through the source and target eNBs. In this case, the RLC PDUs are delivered to the PDCP 1305 of the source eNB through different paths. The PDCP 1305 of the source eNB saves the RLC SDUs received form the respective RLC layers into the buffer 1325. If the collected RLC SDUs is over a predetermined amount, the RLC PDUs are reordered by the reordering block 1320 and then delivered to the legacy PDCP block.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A method for controlling packets by a first base station in a mobile communication system, the method comprising:
   determining a first downlink packet to be transmitted to a terminal via the first base station and a second downlink packet to be transmitted to the terminal via a second base station, based on a downlink packet being received from a serving gateway (S-GW);
   transmitting the first downlink packet to the terminal via the first base station;
   transmitting, to the terminal via the second base station, the second downlink packet, including a segment media access control (MAC) control element (CE) including a first segment indicator and a last segment indicator determined based on a radio link control (RLC) protocol data unit (PDU) associated with the second downlink packet being divided, the second downlink packet being divided by the first base station; and
   reordering a first uplink packet which is received from the terminal via the first base station and a second uplink packet which is received from the terminal via the second base station, based on an uplink packet being received from the terminal and the received packet being over a predetermined amount,
   wherein a reordering timer is started based on there being packets not received among the packets transmitted from the terminal, and
   wherein the reordering timer is reset based on at least one packet among the packets that were not received being received before all of the packets that were not received are received.

2. The method of claim 1, wherein a first media access control (MAC) entity for the first base station and a second MAC entity for the second base station are configured in the terminal.

3. The method of claim 1, wherein a packet data convergence protocol (PDCP) entity, a radio link control (RLC) entity, and a media access control (MAC) entity are configured in the first base station.

4. The method of claim 1, wherein a radio link control (RLC) entity and a media access control (MAC) entity are configured in the second base station.

5. The method of claim 1, wherein the reordering the first uplink packet and the second uplink packet further comprises:
   storing the first uplink packet and the second uplink packet in a buffer.

6. A first base station for controlling packets in a mobile communication system, comprising:
   a transceiver; and
   a controller configured to:
      determine a first downlink packet to be transmitted to a terminal via the first base station and a second downlink packet to be transmitted to the terminal via a second base station, based on a downlink packet being received from a serving gateway (S-GW),
      transmit the first downlink packet to the terminal via the first base station,
      transmit, to the terminal via the second base station, the second downlink packet including a segment media access control (MAC) control element (CE) including a first segment indicator and a last segment indicator determined based on a radio link control (RLC) protocol data unit (PDU) associated with the second downlink packet being divided, the second downlink packet being divided by the first base station, and
      reorder a first uplink packet which is received from the terminal via the first base station and a second uplink packet which is received from the terminal via the second base station, based on an uplink packet being received from the terminal and the received packet being over a predetermined amount,
   wherein a reordering timer is started based on there being packets not received among the packets transmitted from the terminal, and
   wherein the reordering timer is reset based on at least one packet among the packets that were not received being received before all of the packets that were not received are received.

7. The first base station of claim 6, wherein a first media access control (MAC) entity for the first base station and a second MAC entity for the second base station are configured in the terminal.

8. The first base station of claim 6, wherein a packet data convergence protocol (PDCP) entity, a radio link control (RLC) entity, and a media access control (MAC) entity are configured in the first base station.

9. The first base station of claim 6, wherein a radio link control (RLC) entity and a media access control (MAC) entity are configured at the second base station.

10. The first base station of claim 6, wherein the controller is further configured to:
    store the first uplink packet and the second uplink packet in a buffer.

11. A method by a terminal, the method comprising:
    receiving a first downlink packet from a first base station;
    receiving a second downlink packet from a second base station, the first downlink packet and the second downlink packet being determined by the first base station; and
    transmitting a first uplink packet to the first base station and a second uplink packet to the first base station via the second base station,
    wherein the second downlink packet includes a segment media access control (MAC) control element (CE) including a first segment indicator and a last segment indicator determined based on a radio link control (RLC) protocol data unit (PDU) associated with the second downlink packet being divided,
    wherein the first uplink packet and the second uplink packet are reordered based on the first uplink packet and the second uplink packet being over a predetermined amount,
    wherein a reordering timer is started based on there being packets not received among the packets transmitted from the terminal, and
    wherein the reordering timer is reset based on at least one packet among the packets that were not received being received before all of the packets that were not received are received.

12. The method of claim 11, wherein a first media access control (MAC) entity for the first base station and a second MAC entity for the second base station are configured to the terminal.

13. The method of claim 11,
wherein a packet data convergence protocol (PDCP) entity, a radio link control (RLC) entity, and a MAC entity are configured to the first base station, and
wherein the RLC entity and the MAC entity are configured to the second base station.

14. The method of claim 11, wherein the first uplink packet and the second uplink packet are stored in a buffer.

15. A terminal, the terminal comprising:
a transceiver; and
a controller configured to:
  receive a first downlink packet from a first base station,
  receive a second downlink packet from a second base station, the first downlink packet and the second downlink packet being determined by the first base station, and
  transmit a first uplink packet to the first base station and a second uplink placket to the first base station via the second base station,
wherein the second downlink packet includes a segment media access control (MAC) control element (CE) including a first segment indicator and a last segment indicator determined based on a radio link control (RLC) protocol data unit (PDU) associated with the second downlink packet being divided,
wherein the first uplink packet and the second uplink packet are reordered based on the first uplink packet and the second uplink packet being over a predetermined amount,
wherein a reordering timer is started based on there being packets not received among the packets transmitted from the terminal, and
wherein the reordering timer is reset based on at least one packet among the packets that were not received being received before all of the packets that were not received are received.

16. The terminal of claim 15, wherein a first media access control (MAC) entity for the first base station and a second MAC entity for the second base station are configured to the terminal.

17. The terminal of claim 15,
wherein a packet data convergence protocol (PDCP) entity, a radio link control (RLC) entity, and a MAC entity are configured to the first base station, and
wherein the RLC entity and the MAC entity are configured to the second base station.

18. The terminal of claim 15 wherein the first uplink packet and the second uplink packet are stored in a buffer.

* * * * *